UNITED STATES PATENT OFFICE.

ROBERT E. SCHMIDT, OF ELBERFELD, GERMANY, ASSIGNOR TO THE FARBENFABRIKEN, VORMALS FR. BAYER & CO., OF SAME PLACE.

ALIZARINE DERIVATIVE.

SPECIFICATION forming part of Letters Patent No. 476,418, dated June 7, 1892.

Application filed November 18, 1891. Serial No. 412,302. (Specimens.)

*To all whom it may concern:*

Be it known that I, ROBERT E. SCHMIDT, doctor of philosophy, chemist, (assignor to the FARBENFABRIKEN, VORMALS FR. BAYER & Co., at Elberfeld,) a subject of the Emperor of Germany, residing at Elberfeld, Germany, have invented a new and useful Improvement in the Manufacture of Alizarine Derivatives, of which I give in the following a specification.

My invention relates to the production of a new alizarine compound by oxidizing the alizarine bordeaux of my Letters Patent No. 446,893, dated February 24, 1891, in sulphuric-acid solution at a low temperature with not too great an excess of manganese and by combining the resulting oxidized product with salicylic acid, likewise in sulphuric-acid solution.

In carrying out my process practically I proceed as follows: Ten kilos of dried alizarine bordeaux are dissolved in two hundred kilos of sulphuric acid at 66° Baumé. Ten kilos of finely-powdered manganese, containing about eighty-eight per cent. of binoxide, are introduced into this solution, with the precaution that the temperature does not surpass 25° centigrade. In this manner a sulphuric-acid solution results which contains the quinone of an oxyanthraquinone, and the reaction that here takes place is the following: The alizarine bordeaux, which I have found is a tetraoxyanthraquinone, is changed by the action of manganese in sulphuric-acid solution at first into pentaoxyanthraquinone, and the latter, which represents an anthraquinone, in which five hydrogen atoms are substituted by hydroxyl, is further oxidized to a diquinone. The said sulphuric-acid solution of the diquinone is slowly, and at a temperature not exceeding 25° centigrade, mixed on stirring with ten kilos of salicylic acid. The combination of the latter acid with the anthradiquinone is finished when the color of the solution has changed from blue to bluish green. After about eighteen hours the whole mass is poured into two thousand liters of water and the liquid is heated for a short time to boiling. The separated dye-stuff may then be filtered off, and after having been purified from the adhering sulphuric acid by washing with water it may directly be employed for dyeing. My new product thus obtained forms a greenish-black amorphous mass with metallic luster. It is almost insoluble in cold and hot water, soluble in sodium carbonate with reddish-blue color, and very easily in soda-lye with greenish-blue color, and in ammonia with pure blue color. It is dissolved by concentrated sulphuric acid with pure greenish-blue color, out of which solution yellowish-brown flakes are precipitated on the addition of water. It dyes wool mordanted with chromium salts in greenish-blue shades.

Having thus described my invention, what I claim as new, and desire to secure by Letters Patent, is—

1. The process for the manufacture of a coloring-matter by oxidizing the alizarine bordeaux herein described with manganese in concentrated sulphuric-acid solution and by combining the resulting diquinone with salicylic acid, likewise in sulphuric-acid solution.

2. The coloring-matter derived from alizarine bordeaux, which is a greenish-black amorphous mass with metallic luster, almost insoluble in cold and hot water, soluble in sodium carbonate with reddish-blue color and very soluble in soda-lye with greenish-blue, and in ammonia with pure blue color, in concentrated sulphuric acid with greenish-blue color, from which solution yellowish-brown flakes are precipitated on the addition of water, and which dyes wool mordanted with chromium salts in greenish-blue shades.

In testimony whereof I have signed my name in the presence of two subscribing witnesses.

ROBERT E. SCHMIDT.

Witnesses:
RUDOLPH FRICKE,
WM. ESSENWEIN.